United States Patent [19]

Gunther

[11] 4,097,273

[45] Jun. 27, 1978

[54] ARSENIC/SELENIUM RECOVERY

[75] Inventor: Wolfgang H. H. Gunther, Webster, N.Y.

[73] Assignee: Xerox Corporation, Stamford, Conn.

[21] Appl. No.: 794,282

[22] Filed: May 5, 1977

[51] Int. Cl.[2] ............................................ C22B 33/00
[52] U.S. Cl. .................................. 75/121; 75/101 R; 423/87; 423/510; 96/1.5 R
[58] Field of Search .............. 75/121, 101 R, 101 BE, 75/134 H, 134 P, 6; 423/508, 509, 510, 87; 96/1.5

[56] References Cited

U.S. PATENT DOCUMENTS

| | | | |
|---|---|---|---|
| 3,709,680 | 1/1973 | Holmes et al. | 75/121 |
| 3,848,069 | 11/1974 | Carey et al. | 75/101 R |
| 3,992,511 | 11/1976 | Waehner et al. | 423/510 |

*Primary Examiner*—M. J. Andrews

[57] ABSTRACT

Disclosed is a method for the recovery and purification of arsenic/selenium alloys which are contaminated with organic and inorganic materials. The method comprises:
 a. dissolving the alloy in an aqueous solution of morpholine, piperidine or a lower aliphatic primary or secondary amine which is a solvent for the alloy but a non-solvent for the contaminants therein,
 b. physically separating the resulting alloy solution from the undissolved contaminants, and
 c. evaporating the alloy solution to dryness to recover the alloy.

10 Claims, No Drawings

ARSENIC/SELENIUM RECOVERY

BACKGROUND OF THE INVENTION

This invention relates to a method for the recovery of arsenic/selenium alloys and more particularly to the reclamation of such alloys which are useful in electrostatographic copying. This form of copying, originally disclosed by C. F. Carlson in U.S. Pat. No. 2,297,691, involves as an initial step the uniform charging of a plate or drum comprised of a conductive substrate normally bearing on its surface a non-conductive blocking layer which is covered by a layer of photoconductive insulating material. Typically, the conductive substrate is comprised of aluminum having a thin layer of non-conductive aluminum oxide on its surface. After charging, the device is exposed to activating radiation in imagewise configuration which results in dissipation of the electrostatic charge in the exposed areas while the non-exposed areas retain the charge in a pattern known as the latent image. The latent image is developed by contacting it with an electroscopic marking material known as toner. This material, which normally comprises particles of a thermoplastic resin containing a colorant such as carbon black, is electrostatically attracted to the latent image which is, by definition, in the configuration of the portions of the photosensitive device which were not exposed to the activating radiation. The toner image may be subsequently transferred to paper and fused to it to form a permanent copy. Following this, the latent image is erased by discharging the drum and excess toner cleaned from it to prepare the device for the next cycle.

The photoconductive insulating material is characterized in that it has a high electrical resistance in the dark which resistance decreases significantly upon exposure to activating radiation. Amorphous selenium was found to be an efficient inorganic photoconductor and has been widely used in certain plain paper copiers. More recently, arsenic/selenium alloys have come into their own as commercially acceptable inorganic photoconductors. Arsenic alloys of selenium are preferable to selenium for several reasons. First of all, the photodischarge speed of such alloys is faster than that of pure selenium. In addition, these alloys are photoresponsive to longer wavelengths of light than is pure selenium and therefore can be used to copy a wide spectrum of material. Furthermore, arsenic/selenium alloys are generally harder than pure selenium and are therefore more resistant to physical abrasion. In spite of the increased resistance to physical abrasion, photosensitive devices employing arsenic/selenium as the photoconductor do tend to wear out and must be replaced.

It is apparent that sound economics dictates the recovery and reuse of the arsenic/selenium alloy remaining on the discarded photosensitive devices. Such reclamation involves removing the alloy from its substrate and purifying it to a state of purity suitable for reuse as a photoconductive alloy. Several methods have been used to remove the alloy from the substrate. One such method involves a thermal shock treatment. This method is effective, but its efficiency decreases as further research improves the adhesion between the alloy layer and the substrate. Another method involves hydraulic lathing which works well when the substrate is flexible as in the case of an endless flexible belt, but is not readily adaptable to those devices wherein the substrate is of a thickness too great to permit flexibility. Mechanical shaving may be used to remove the layer of arsenic/selenium from the substrate in this situation. Mechanical shaving effectively removes the arsenic/selenium from the substrate but tends to produce an alloy contaminated by metal, especially aluminum. In these cases, the final separation from the metal becomes very difficult. Distillation gives a residue of metal selenides; attempted metal dissolution in acid gives toxic arsine and hydrogen selenide by-products. Dissolution of the alloys in aqueous sodium hydroxide introduces its own set of bulk contaminants.

It would be desirable and it is an object of the present invention to provide a novel method for the recovery of arsenic/selenium alloys.

Another object is to provide such a process which can be used to purify the recovered alloy.

A further object is to provide such a process which employs the solubility of arsenic/selenium alloys in solvents which are non-solvents for contaminants normally found in such alloys.

SUMMARY OF THE INVENTION

The present invention is a method for the recovery of arsenic/selenium alloys. The method comprises:
 a. dissolving an arsenic/selenium alloy containing from about 2 to about 36 weight percent arsenic in an aqueous solution of morpholine, piperidine or a primary or secondary amine of the formula:

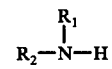

wherein $R_1$ is an aliphatic group containing from 1 to 4 carbon atoms, and $R_2$ is either H or an aliphatic group containing from 1 to 4 carbon atoms, and
 b. evaporating the resulting solution to dryness optionally employing additional heat and/or vacuum to thereby recover the arsenic/selenium alloy.

The method can be used for the purification of arsenic/selenium alloys containing organic and inorganic contaminants which are insoluble in the aqueous amine solution. In this embodiment of the invention the arsenic/selenium in solution is separated from the undissolved contaminants before evaporating the solution to dryness.

DETAILED DESCRIPTION AND PREFERRED EMBODIMENTS

The present invention is predicated on the discovery that aqueous solutions of certain primary and secondary amines react with arsenic/selenium alloys to give readily soluble crystalline amine derivatives, which derivatives have low thermal and vacuum stability. Thus, the solubilized alloy can readily be recovered by evaporating to dryness, optionally under vacuum, the solution of crystalline amine derivatives of the arsenic/selenium alloy.

Primary and secondary amines useful in the present invention are morpholine, piperidine or those compounds which correspond to the formula:

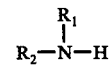

wherein $R_1$ is an aliphatic group of 1 to 4 carbon atoms, and $R_2$ is either H or an aliphatic group of 1 to 4 carbon atoms.

Amines useful in the present invention include methylamine, dimethylamine, ethylamine, diethylamine, n-propylamine, di-n-propylamine, isopropylamine, di-isopropylamine, n-butylamine, di-n-butylamine, isobutylamine (2-methyl-propylamine), di-isobutylamine, sec-butylamine (1-methyl-propylamine), and 2-methyl-propylamine (1,1-dimethylethylamine). These amines are quite miscible with water and are used in the form of their aqueous solutions in this invention. The concentration of the amine in solution is not critical although solutions containing 10 to 40 weight percent of the amine are generally preferred.

Arsenic/selenium alloys which have been found to be solubilized in amine solutions contain from about 2 to about 36 weight percent arsenic. Alloys containing selenium concentrations outside this range are not readily solubilized. The process works well for alloys containing from 2–36% arsenic and works especially rapidly for alloys containing from 5 to 25 percent arsenic.

The process disclosed herein can be used to strip the arsenic/selenium from worn out xerographic drums such as by rotating the drum through a bath of the amine solution.

In practice, the arsenic/selenium recovered from electrostatographic photosensitive devices will normally be contaminated with organic toner residue. In those situations where the alloy is removed from its aluminum substrate by mechanical shaving, it will be contaminated with bits of aluminum and aluminum oxide. Since these contaminants are insoluble in the amine solutions, the scrap alloy, preferably in a finely ground state to facilitate rapid dissolution, is added to the aqueous amine solution. Depending on the arsenic concentration in the alloy, its physical state and the concentration of and structure of the amine, dissolution may be quite rapid (2 minutes or less) or rather slow (2–3 days). Heating the solution is optionally employed to increase the rate of dissolution. As previously mentioned, one can use the amine solution as a bath to strip the drum. Also, the shaved alloy can be packed into a bed and percolated with the amine solution at a rate that will produce a saturated solution at the overflow point.

The arsenic/selenium goes into solution as an alloy amine/salt, the exact structure of which is not well understood. After the alloy has gone into solution in the case of a contaminated alloy, the contaminants are removed from the liquor by standard solid/liquid separation techniques such as filtration or centrifugation and decantation.

The remaining liquid, i.e. either filtrate or decantate, is then distilled to dryness. Such distillation also reconverts the alloy/amine salt back to the alloy due to the relatively low stability of the salt and high volatility of the amine. Higher boiling amines such as dibutyl amine would be removed under vacuum to keep the reaction temperature below the crystallization temperature of the alloy. Recovery and reuse of the volatilized amine is, of course, desirable for economic reasons. Further purification of the recovered alloy, such as by fractional distillation, is generally desirable. The invention is further illustrated by the following examples in which all precentages are by weight unless otherwise specified.

EXAMPLE I

A dilute solution of arsenic/selenium alloy is prepared by dissolving the alloy in 40% methylamine in water. Two alloy samples are used; I is a powder containing 20% arsenic and II is in the form of beads containing 35.5% arsenic. Rapid dissolution of sample I is observed; sample II dissolves completely in 65 hours leaving some orange crystals. It is difficult to isolate the product without decomposition. Water dilution gives a yellow-orange solution. Addition of methanol or ethanol gives a brownish, apparently non-crystalline precipitate which when heated results in mirror spots on the side of the reaction vessel. Evaporation of the liquid in the reaction vessel leaves a brown, shiny residue of arsenic/selenium.

EXAMPLE II

An arsenic/selenium alloy containing 35.5% arsenic in the form of beads with a diameter of about 2 millimeters is provided. These beads, weighing 10 grams, are stirred with an aqueous solution of morpholine (20 ml. in 50 ml. of water) at room temperature. Dissolution occurs over a period of 17 hours at which time the vessel is filled with a suspension of yellow-orange crystals. The crystals are collected by filtration and dried in air after washing with alcohol, ether and petroleum ether. They are found to have a molecular composition of $AsSe_3.C_4H_9NO$. Upon mild heating of about 100° C in vacuum, the crystalline species is found to lose a molecule of morpholine and there remains an amorphous arsenic/selenium alloy containing these elements in the proportion of 1:3.

EXAMPLE III

The procedure of Example I is repeated with various other amines. The results are as follows:

(1) Tributylamine: Alloy I gets sticky and appears to swell; a faint yellow solution is formed. Alloy II undergoes no gross reaction after 65 hours.

(2) Pyridine: Some red turbidity is noted with Alloy I, however, no gross reaction occurs in 65 hours.

(3) Triethylamine: Some yellow solution is noted with Alloy II but there is no gross disappearance of the beads after 65 hours.

The differences in reactivity between methylamine in Example I, morpholine in Example II and those amines of Example III indicate that only the lower aliphatic primary and secondary amines are useful in the present invention.

EXAMPLE IV

A series of xerographic photoreceptor drums containing a photoelectrically active layer of arsenic/selenium alloy are immersed in a bath of 40% methylamine in water. Dissolution of the alloy begins immediately and is complete in 1 to 2 hours depending on the degree of agitation, freshness of the stripping bath, temperature, etc. The stripped drums are removed from the bath, rinsed in turn with 5% methylamine in water and deionized water and dried. After drying, the drums are reusable in alloy vapor deposition processes. The stripping solution, after a sufficient number of drums have been treated, is filtered to remove insoluble contaminants contained therein and then distilled to recover the arsenic/selenium alloy. The recovered alloy is recycled into production whereas the distillate of aqueous methylamine is recovered for reuse in stripping baths.

EXAMPLE V

An arsenic/selenium alloy containing about 36% arsenic which is contaminated with aluminum, aluminum oxide and toner residue is dissolved in a 40% aqueous solution of methylamine. The contaminants remain undissolved and are separated from the alloy solution by filtration. The filtrate is evaporated to dryness to provide arsenic/selenium free of contaminants.

EXAMPLE VI

A quantity of arsenic/selenium alloy shavings from xerographic drums (100 gm.) is added to 200 ml of a 40% aqueous solution of methylamine. The mixture is stirred without heating until most of the solids have dissolved. There remains suspended in the yellow solution small metal particles, the result of mechanical drum stripping. The solution is filtered through a glass fritte, placed into a 1 liter round bottomed flask and the solvent removed in vacuo using a rotary evaporator with a bath temperature of approximately 60° C. There remains a brownish-black shiney mass of arsenic selenide alloy free of amine insoluble contaminants such as metal chips, polymeric toner residue, carbon black and the like. The recovered alloy is further purified by vacuum distillation using quartz vessels as is known in the art. The resulting product is analyzed for arsenic and selenium composition, the proportions adjusted to a desired level and used in the production of vapor deposited photoreceptor coatings.

What is claimed is:

1. A method for the recovery of arsenic/selenium alloys which comprises:
   a. dissolving an arsenic/selenium alloy containing from about 2 to about 36 weight percent arsenic in an aqueous solution of morpholine, piperidine or a primary or secondary amine of the formula:

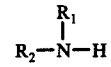

wherein $R_1$ is an aliphatic group containing from 1 to 4 carbon atoms and $R_2$ is either H or an aliphatic group containing from 1 to 4 carbon atoms, and
   b. evaporating the resulting solution to dryness to thereby recover the arsenic/selenium alloy.

2. The method of claim 1 wherein the amine is methylamine, dimethylamine, ethylamine, diethylamine, n-propylamine, di-n-propylamine, isopropylamine, di-n-butylamine, isobutylamine, di-isobutylamine, sec-butylamine or 2-methyl-propylamine.

3. The method of claim 2 wherein the amine is methylamine.

4. The method of claim 1 wherein the amine solution contains from 10 to 40 weight percent of the amine dissolved in water.

5. The method of claim 1 wherein the arsenic/selenium alloy contains from 5 to 25 weight percent arsenic.

6. The method of claim 1 wherein the arsenic/selenium alloy contains an organic or inorganic contaminant which is insoluble in the amine solution and the arsenic/selenium in solution is separated from the undissolved contaminants before the solution is evaporated to dryness.

7. The method of claim 6 wherein the contaminants are separated from the arsenic/selenium solution by filtration or decantation.

8. The method of claim 6 wherein the amine is methylamine.

9. The method of claim 6 wherein the amine solution contains from 10 to 40 weight percent of the amine dissolved in water.

10. The method of claim 6 wherein the arsenic/selenium alloy contains from 5 to 25 weight percent arsenic.

* * * * *